H. CSANYI.
SECONDARY BATTERY.
APPLICATION FILED FEB. 27, 1917.
1,279,279.
Patented Sept. 17, 1918.
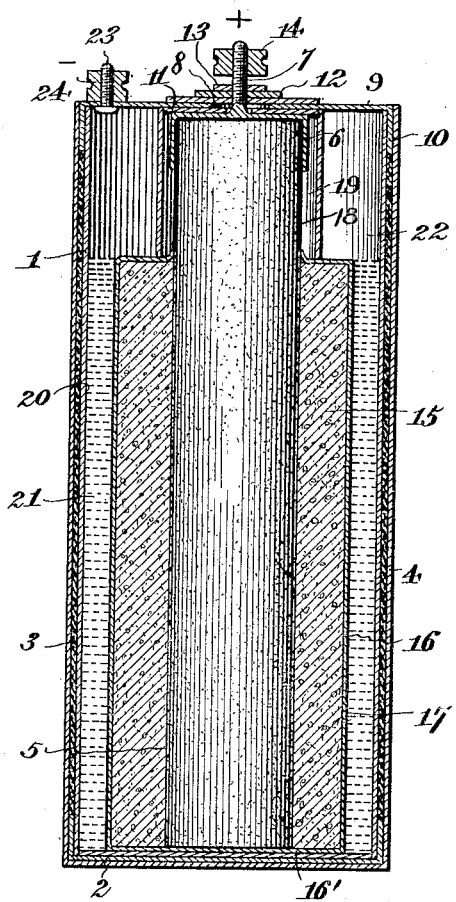
Fig. 1.
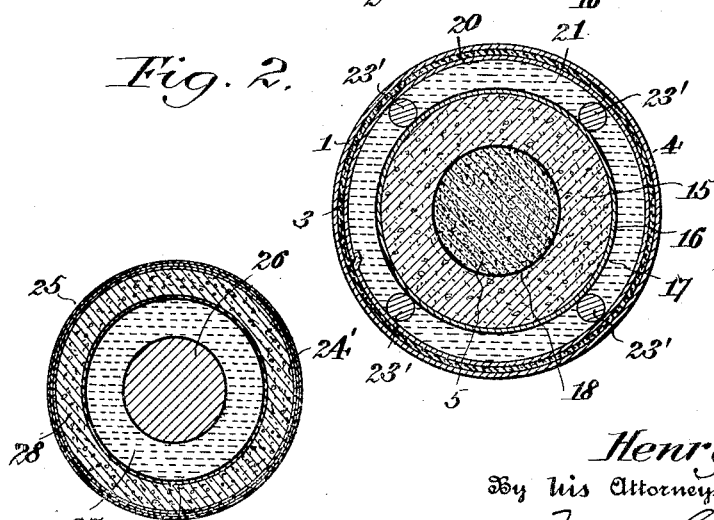
Fig. 2.
Fig. 3.
Inventor
Henry Csanyi.
By his Attorneys,
Myers, Cushman & Rea.

UNITED STATES PATENT OFFICE.

HENRY CSANYI, OF NEW YORK, N. Y.

SECONDARY BATTERY.

1,279,279.  Specification of Letters Patent.  Patented Sept. 17, 1918.

Application filed February 27, 1917. Serial No. 151,215.

*To all whom it may concern:*

Be it known that I, HENRY CSANYI, a citizen of the United States, residing at New York, in the county of New York and State of New York, have invented certain new and useful Improvements in Secondary Batteries, of which the following is a specification.

This invention relates to certain novel and useful improvements in storage batteries. In the present instance it is my purpose to provide a storage battery which in its assembled, operative condition is completely closed and sealed so that the accidental spilling and consequent loss of the battery solution or electrolyte is prevented and the necessity of frequently refilling the cell is obviated.

A further object of the invention is the provision of a storage battery which, when charged and in use will last much longer than the ordinary battery and when exhausted may be re-charged at an exceedingly low cost.

It is also my purpose to provide a battery which will embody the desired features of simplicity, efficiency and durability and which may be manufactured, marketed and operated at a relatively low cost.

With the above recited objects and others of a similar nature in view, my invention consists in the construction, combination and arrangement of parts set forth in and falling within the scope of the appended claims.

In the accompanying drawings—

Figure 1 is a vertical, longitudinal sectional view taken through a complete battery embodying my invention.

Fig. 2 is a horizontal cross-sectional view taken through the battery shown in Fig. 1, and approximately centrally thereof.

Fig. 3 is a sectional view through a portion of a modified form of battery.

Referring now to the accompanying drawings in detail, and particularly to Fig. 1, the numeral 1 indicates a shell or casing of suitable metal, such as zinc or lead, and which is preferably cylindrical in form and provided with a closed bottom 2. The outer vertical face of the shell is preferably provided with a coating of coal tar or similar material indicated at 3 and this coating 3, in turn, is faced or enveloped in paper indicated at 4, the coal tar and paper coatings, or layers, constituting suitable exterior insulation for the battery. Located within the casing and extending centrally and longitudinally thereof is the carbon stick 5 constituting a positive electrode. The upper end of the electrode 5 is surmounted by a metallic cap 6 from which projects the upwardly extending threaded shank 7, which constitutes the positive terminal of the battery, the cap and shank 7 being preferably made of brass. This threaded shank 7 extends through an aperture 8 formed centrally of the metallic top 9 of the shell 1, such top being provided with a depending circumferential flange 10 fitting snugly over the upper end of such shell 1 so as to make a tight fit therewith.

A disk 11 of pasteboard, paper, fiber or other suitable material rests on top of the brass cap 6 and when the battery is assembled lies between this cap and the adjacent portion of the underface of the shell top 9, the threaded shank 7 passing through this disk and through the washers 12 and 13 which are imposed upon the outer face of the top 9 and overlie the central opening 8 therein. When the nut 14, which is threaded onto the shank 7 and which may form a binding nut for the end of the positive conductor wire, is screwed down tightly into position, it will act to hold the top 9 with the washers and disks firmly in position, thus completely and positively closing and sealing the battery cell and preventing the escape or spilling of any of the electrolyte.

The carbon electrode 5 for the greater portion of its length from the bottom end to top is surrounded by the depolarizing material indicated at 15 and this depolarizing material in the present instance is in the nature of a paste-like compound preferably, though not necessarily, made up of approximately 70% red lead ($Pb_3O_4$), 21% graphite (C) and 9% ammonium chlorid ($H_4NCl$). These ingredients are intimately mixed or worked up and applied in the form of a smooth paste as indicated in Fig. 1. The depolarizing compound thus applied is faced with a layer or covering of filter paper shown at 16, which also extends beneath the bottom of the positive electrode as shown at 16' and this filter paper in turn is covered or faced with a thin pervious fabric, such as cheese cloth, indicated at 17. As will be seen by reference to Fig. 1, the upper end portion of the carbon electrode is not surrounded or embedded in the depolarizer, and this exposed upper end of the carbon electrode is preferably treated or coated with coal tar as indicated at 18 and is then housed or incased in a sleeve 19, of fibrous material, such as paper, the upper end of which bears against the under side of the top 9 of the shell or casing 1 while the lower end of this fibrous or paper sleeve rests upon the top of the depolarizer body which is covered or incased in the filter paper and cheese cloth as hereinbefore mentioned. As will be seen by reference to Fig. 1, when the carbon electrode with the surrounding depolarizing material is placed or seated in the zinc or lead shell or casing 1, an annular space or chamber 20 is formed between the depolarizer material and the inner face of the shell or casing 1, and this space or chamber is filled with a suitable electrolyte 21. In the present instance this electrolyte preferably, though not necessarily, consists of 80% water ($H_2O$): 12% ammonium chlorid ($H_4NCl$); 6% zinc chlorid ($ZnCl_2$) and 2% salt ($NaCl$). If it is desired to give to this electrolyte a paste-like consistency I may add suitable substances, such for instance, as potato flour 2 parts, wheat flour 1 part and a small amount of gelatin, say 2 grams. The electrolyte is preferably poured in until its level is flush with the top of the mass or body of depolarizing material, as is illustrated in Fig. 1, and it will be noted that there is a relatively wide annular space 22 formed at the upper end portion of the shell or casing 1, and this space 22 forms a circular air chamber, so that while there will be a small amount of vapor gas generated in the battery still such vapor gas as may be generated will condense in this chamber and the fluid products of condensation will flow or drop back into the electrolyte. Thus I obviate the possibility of gas accumulating in the battery escaping therefrom and thus weakening or decreasing the efficiency of the latter, for, as above mentioned, the battery structure itself is completely sealed so that neither gas nor the electrolyte can escape therefrom, while any small amount of gas which may be generated will be re-condensed. The negative electrode of the battery is of course formed by the zinc shell 1, and the top 9 thereof is preferably provided with a negative terminal or post 23 having the usual binding nut 24, a conductor wire being intended of course to be attached to this negative binding post or terminal.

In order to maintain the positive electrode 5 with the surrounding depolarizer material and the parts connected therewith, stationary or in proper nested position or in spaced relation to the casing 1, I may provide any suitable spacers or spacing rods, such, for instance, as the vertical rods or bars shown at 23' in Fig. 2. As will be seen by reference to said figure, I employ four of these rods, and they may be suitably bound, as by bands, or the like, to the outer face of the fiber covered depolarizer body. It will of course be understood that these spacers or rods may be of any suitable character and arranged in any preferred manner, the obvious purpose of the same being to prevent the wabbling or derangement of the depolarizer body in the casing, these spacers 23 forming supports for preventing the lateral shifting of the depolarizer.

In Fig. 3 I have shown a slightly modified form of the invention, in this case the lead shell 24', which is coated or incased in paper 25 having a central electrode 26 of zinc or lead which is surrounded by the electrolyte 27, which may be of the same composition as the electrolyte 21, described, and surrounding this electrolyte, or forming a chamber therefor is the depolarizer 28, a layer of filter paper being interposed at 29 between the electrolyte and the depolarizer. Of course the terminals will be connected with the lead shell 24 and the zinc or lead electrode 26, preferably as described for the structure in Fig. 1, and it is therefore unnecessary to illustrate the same.

For the above description, taken in connection with the accompanying drawing, the construction and operation of my improved battery will be readily understood by those skilled in the art. It will be noted that from the standpoints of durability, resistance to breakage, and capability of being recharged it possesses manifest points of advantage, and due to the fact that it is completely sealed and insulated, it will last a relatively long time while operating at a maximum efficiency.

While I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claims.

What I claim is:

1. An electric battery comprising a metallic shell having a member constituting one terminal of the battery, said shell having a closed bottom and a top provided with an aperture, a central electrode surmounted by a cap having an extension projecting through the apertured top constituting the other terminal of the battery, a depolarizer and an electrolyte within the shell, means interposed between and separating the depolarizer and the electrolyte, there being a space or chamber formed between the surface levels of the depolarizer and the electrolyte and the top of the shell, and means interposed between the cap and the top of the shell for sealing the aperture in the shell top.

2. An electric battery comprising a metallic shell having a member constituting one terminal of the battery, said shell having a closed bottom and a removable top, a central electrode provided with a cap having a member extending through an opening in the shell top and constituting the other terminal of the battery, a depolarizer and an electrolyte within the casing, and surrounding the major portion of the central electrode, the surface levels of the depolarizer and the electrolyte lying below the top of the central electrode, means interposed between and separating the depolarizer and the electrolyte, a sleeve surrounding the upper portion of the central electrode and extending between the surface levels aforesaid and the top of the cap, and a sealing disk lying against the underside of the top to seal the opening therein.

3. An electric battery comprising a metallic shell having a member constituting one terminal of the battery, said shell having a closed bottom and a removable top, insulating material surrounding the shell, a central electrode within the shell and surmounted by a metallic cap having an extension which projects through an opening in the top of the shell and constitutes the other terminal of the battery, external and internal disks for sealing the shell adjacent the point where the member projects through the shell top, a depolarizer and an electrolyte within the shell and surrounding the central electrode, and means including filter material interposed between and separating the depolarizer and the electrolyte.

4. An electric battery comprising a metallic shell having a part constituting one terminal of the battery, said shell having a closed bottom and a top provided with an aperture, a central electrode arranged within the shell and provided with a cap having an extension projecting through the aperture in the shell top and constituting the other terminal of the battery, disk-like members for sealing the aperture in the shell top, an electrolyte and a depolarizer arranged within the shell and surrounding the central electrode, a sheet of filter material interposed between the electrolyte and the depolarizer, there being a space formed between the surface levels of the electrolyte and the depolarizer and the top of the shell, a sleeve member surrounding the upper portion of the central electrode and extending between the surface levels of the electrolyte and depolarizer and the top of the shell, and an insulating coating surrounding the shell.

In testimony whereof I affix my signature.

HENRY CSANYI.

Copies of this patent may be obtained for five cents each, by addressing the "Commissioner of Patents, Washington, D. C."